United States Patent [19]

McGlynn

[11] 3,735,477

[45] May 29, 1973

[54] METHOD OF USING AND REMOVING A PARTING COMPOUND

[75] Inventor: James J. McGlynn, Paoli, Pa.

[73] Assignee: Lukens Steel Company, Coatesville, Pa.

[22] Filed: Oct. 13, 1971

[21] Appl. No.: 188,995

Related U.S. Application Data

[62] Division of Ser. No. 795,044, Jan. 29, 1969, Pat. No. 3,658,565.

[52] U.S. Cl. ................................................29/470.9
[51] Int. Cl. ................................................B23k 1/20
[58] Field of Search......................29/470.9, DIG. 38

[56] References Cited

UNITED STATES PATENTS

| | | | |
|---|---|---|---|
| 3,015,885 | 1/1962 | McEuen et al. | 29/470.9 |
| 3,186,083 | 6/1965 | Wright, Jr. | 29/470.9 |
| 3,393,445 | 7/1968 | Vlam | 29/470.9 |
| 3,466,734 | 9/1969 | Vordahl | 29/470.9 |

*Primary Examiner*—J. Spencer Overholser
*Assistant Examiner*—Richard Bernard Lazarus
*Attorney*—Mason, Mason & Albright

[57] ABSTRACT

A process of preparing a pack of composite metal plate assemblies wherein juxtaposed surfaces of stainless steel to be separated have applied thereto a parting composition comprising a mixture of an oxide of chromium and manganese dioxide in a ratio of about 0.01—5 parts of the chromium compound to 1 part of the manganese dioxide by volume. The assembly is thereafter hot worked. When separated the coatings formed on the surfaces of the stainless steel plates are removed without pretreating by means such as mechanical means or a caustic bath, such removing being with an acid pickle of nitric and hydrofluoric acids.

5 Claims, No Drawings

METHOD OF USING AND REMOVING A PARTING COMPOUND

RELATED APPLICATION

This application is a divisional application of application Ser. No. 795,044 filed Jan. 29, 1969, now U.S. Pat. No. 3,658,565 of Apr. 25, 1972.

SUMMARY AND BACKGROUND OF THE INVENTION

This invention is directed to a parting composition useful in preventing adhesion between adjoining metal surfaces in the hot working of clad assemblies. Clad assemblies are usually prepared as composite assemblies in which a relatively thin sheet of corrosion-resistant alloy is adhered to a thicker and comparatively less expensive backing plate. Thus, such alloys as chrome, chrome-nickel steel, chrome-nickel-molybdenum steel, nickel, nickel alloys, copper, and copper alloys are welded to plates of plain carbon or low alloy steel.

The usual method of welding sheets to plates is to form an assembly by superimposing a corrosion-resistant layer over a backing plate, excluding air from the area to be welded and thereafter hot working the assembly.

In the interest of economy, a plurality or pack of assemblies is frequently formed before hot working and the pack is heated and rolled as a unit to effect welding within each assembly. In general, parting compositions, both organic based and water based are used to prevent welding between the adjacent surfaces of individual assemblies within the pack.

Most parting compositions contain refractory oxides as the principal weld-preventing ingredient and refractory chrome oxides such as $Cr_2O_3$ or $CrO_3$, are commonly used. Manganese dioxide has also been used as a refractory in parting compositions but not in combination with chromium oxides in the same coating. The usual and most convenient mode of applying parting compositions is to form a slurry of the powdered refractory oxide and paint the surfaces to be treated with the slurry when assembling the pack. Thereafter the pack can be subjected to hot working without the danger of welding the individual assemblies to one another. Hot working, in the instance of welding stainless steel to mild steel, is normally carried out at about 2,200° – 2,400°F., usually by rolling the pack until a reduction of at least 2 to 1 in thickness is reached.

After hot working, the individual assemblies are separated from one another. It is then necessary to remove the parting composition which becomes tightly adherent when chrome oxides are used and this is effected by blasting or exposing the assemblies to a molten caustic bath followed by acid pickling.

OBJECTIVES OF THE INVENTION

It is therefore an object of the present invention to provide a new parting composition and process for using same which are effective to prevent welding during hot working and which result in surfaces that can be easily cleaned following exposure to heat and pressure. These and other objects will be apparent from the disclosure set forth below.

DISCLOSURE OF THE PREFERRED EMBODIMENT

A mixture of manganese dioxide and an oxide of chromium, both in particulate form, preferably finely milled to 1–10 micron size when incorporated in an organic or aqueous slurry, operates to prevent welding under hot working conditions. Mixtures of finely divided manganese dioxide and chromium oxide can be used without a binder, but for ease of application, a slurry of the mixture with a binder is used. An organic binder such as that disclosed in U. S. Pat. No. 3,237,298 is suitable in the ratios and amounts disclosed. Preferably, however, a water-based slurry is used, such as the conventional 2 – 10 percent by weight sodium silicate solution. Other additives, such as sand, crushed firebrick, clay and the like can be added if desired.

The amounts of chromium oxide and manganese dioxide to be used can best be expressed in volume ratios of $Cr_2O_3$ to $MnO_2$. Broadly, about 0.01 – 5 parts $Cr_2O_3$ to 1 part $MnO_2$ is operative. Preferably, about 0.3 – 1 parts $Cr_2O_3$ to 1 part $MnO_2$ is used.

Chromium oxide is a superior refractory whereas manganese dioxide imparts superior cleaning characteristics to the parting composition. Higher ratios of $Cr_2O_3$ than 1 part of $Cr_2O_3$ to 1 part of $MnO_2$ by volume do not clean as readily as the preferred ratio. Lower ratios of $Cr_2O_3$ than 0.2 parts $Cr_2O_3$ to 1 part of $MnO_2$ leave rougher surfaces after being cleaned by acid pickle.

As stated above, the mixture of manganese dioxide and oxide of chromium can be used either in an organic slurry such as a conventional ethyl acetate base with nitrocellulose binder, or in an aqueous slurry with a water glass base binder. A water based slurry is more easily sprayed and therefore is preferred. In either case, however, a dried coating thickness of about 0.001 to 0.003 inches is operative.

EXAMPLE 1

Two type 304 ELC stainless steel insert plates each measuring 102½ × 82 × 9/16 inches were spray painted with 1,600 cc (800 cc on each insert) of a mixture containing 3 lbs. of $MnO_2$ and 1 lb. of Cr O in 4 percent water glass (4 percent water glass solution made by diluting "N" type sodium silicate solution with water — 25 volumes of water — 1 volume "N").

Material coverages amounted to 0.256 lb. $MnO_2/ft.^2$ and 0.0085 lb. $Cr_2O_3/ft.^2$ of insert.

The inserts in an assembly with steel backing plates were hot rolled to a 5.4/1 ratio and cleaned in $HNO_3$-HF acid. The $HNO_3$-HF acid used was approximately 10 parts by volume of commercial nitric acid — 2 volume parts of hydrofluoric acid — 88 volume parts of water in a tank holding approximately 12,000 gallons. The acid temperature was 100°F. and the dip time was 10 minutes. Removal of the parting compound under these conditions was substantially complete.

EXAMPLE 2

Two Type 316 DLC stainless steel insert plates measuring 98½ × 82 × 1 1/16 inches were spray painted with 2000 cc (1000 cc on each insert) containing 3.6 lbs. $MnO_2$ and 1.2 lbs. $Cr_2O_3$. The liquid carrier-binder was a 40% water dilution of Type 48 lithium polysilicate solution (DuPont).

The material coverages amount to 0.032 lb. $MnO_2$ per square foot and 0.011 lb. $Cr_2O_3$ per square foot of insert.

These inserts, after being placed in an assembly with backing steels, were hot rolled to a 8½/1 ratio and cleaned in the same $HNO_3$-HF acid mixture as in Example 1. The acid temperature was 105°F. and a dip time of 10 minutes was used. Again the parting compound was effectively removed.

The amount and type of binder used is not critical so long as the oxide particles are maintained discrete. In the above Examples, a 4 percent water glass aqueous solution and a water based polysilicate solution were used but it will be appreciated that the specific composition and type of water glass and amount can vary widely. Similarly, other binders will suggest themselves and can be substituted for those specifically disclosed.

Following hot working, the individual assemblies are separated and their surfaces cleaned with an acid pickle. One acid pickle found to be effective for removing residual parting compound is a mixture of nitric acid and hydrofluoric acid. A dilute acid mixture of $HNO_3$ and HF is capable of dissolving and removing the residual parting composition of the present invention. The acid mixture referred to in the examples is the same commonly used in the trade to pickle, brighten and passivate stainless steels.

The dissolved iron content in the acid mixture of HF and $HNO_3$ should not exceed about 4 percent by weight for best results in removing the parting composition residuals. Higher than 4 percent by weight dissolved iron slows down the removal of the parting compound to some extent. In the above Examples 1 and 2, the dissolved iron content was 3.05 percent and 3.73 percent respectively.

Having thus described my invention what I claim as new and desire to secure by Letters Patent of the United States is:

1. A process for the manufacture of composite metal assemblies including plates composed of stainless steel at least on one of their surfaces, comprising preparing a pack of said assemblies by coating at least one of said stainless steel surfaces with a parting composition composed essentially of a mixture of an oxide of chromium and manganese dioxide, the ratio of the former to the latter being about 0.01 – 5 parts of the chromium compound to 1 part of manganese dioxide by volume, juxtaposing said stainless steel surfaces in said assemblies with said parting compound disposed in a layer between them, hot working said assemblies, separating said assemblies and directly removing the coatings formed on said stainless steel surfaces by subjecting them to an acid pickle of nitric and hydrofluoric acids and without pretreating the coating for example by first blasting or grinding said surfaces, or exposing or subjecting said surfaces to a caustic bath.

2. The process of claim 1 wherein the composition is a slurry of powdered $MnO_2$ and $Cr_2O_3$ and the dried coating thickness of the slurry applied is about 0.001 – 0.003 inches.

3. The process of claim 2 wherein each square foot of the treated surfaces has about 0.03 pounds $MnO_2$ and 0.01 pounds $Cr_2O_3$.

4. The process of claim 2 wherein the slurry is water based and contains a binder.

5. In the process of manufacturing composite metal assemblies which are to be hot worked and include plates having stainless steel surfaces, the new use of a parting compound which is applied to stainless steel surfaces to be juxtaposed in the assembly and separated after the assembly has been hot worked, said parting compound composed essentially of a particulate mixture of a refractory oxide of chromium and manganese dioxide, the ratio of the former to the latter being about 0.01 – 5 parts of chromium compound to 1 part of manganese dioxide by volume, whereby after said assembly has been hot worked and separated the coating formed from the parting compound is such that it is directly removable from said stainless steel surfaces by immersing in an acid pickle without pretreating the coating by for example mechanical means or a caustic bath.

* * * * *